United States Patent
Drazynski et al.

(10) Patent No.: US 8,918,096 B2
(45) Date of Patent: Dec. 23, 2014

(54) METHOD AND APPARATUS PROVIDING MULTI-LEVEL PROXIMITY INDICATION AND SMALL CELL DISCOVERY

(75) Inventors: Karol Drazynski, Wroclaw (PL); Lars Dalsgaard, Oulu (FI); Klaus F. Doppler, Espoo (FI); Juha S. Korhonen, Espoo (FI); Esa M. Malkamaki, Espoo (FI)

(73) Assignee: Nokia Corporation, Espoo (FI)

( * ) Notice: Subject to any disclaimer, the term of this patent is extended or adjusted under 35 U.S.C. 154(b) by 464 days.

(21) Appl. No.: 13/183,648

(22) Filed: Jul. 15, 2011

(65) Prior Publication Data

US 2013/0017820 A1     Jan. 17, 2013

(51) Int. Cl.
    *H04W 4/00*     (2009.01)
    *H04W 48/16*    (2009.01)
    *H04W 84/04*    (2009.01)

(52) U.S. Cl.
    CPC ........... *H04W 48/16* (2013.01); *H04W 84/045* (2013.01)
    USPC ............. 455/422.1; 455/456.1; 455/444; 370/338

(58) Field of Classification Search
    CPC ... H04W 48/16; H04W 84/045; H04W 88/02; H04W 4/02; H04W 88/06
    USPC .......... 455/444, 436, 438, 424, 437, 550.1, 455/422.1; 370/331, 252
    See application file for complete search history.

(56) References Cited

U.S. PATENT DOCUMENTS

| | | | |
|---|---|---|---|
| 6,973,309 B1* | 12/2005 | Rygula et al. | 455/436 |
| 2002/0102976 A1* | 8/2002 | Newbury et al. | 455/436 |
| 2007/0060130 A1* | 3/2007 | Gogic et al. | 455/440 |
| 2007/0213067 A1* | 9/2007 | Li et al. | 455/444 |
| 2010/0304748 A1 | 12/2010 | Henttonen et al. | |
| 2011/0092214 A1* | 4/2011 | Iwamura | 455/438 |
| 2011/0183676 A1* | 7/2011 | Lee et al. | 455/438 |
| 2012/0208556 A1* | 8/2012 | Jung et al. | 455/456.1 |
| 2012/0238268 A1* | 9/2012 | Radulescu et al. | 455/435.1 |
| 2013/0005330 A1* | 1/2013 | Han et al. | 455/424 |

FOREIGN PATENT DOCUMENTS

WO   WO-2011083866 A1   7/2011

OTHER PUBLICATIONS

"New work item proposal for Hetnet Mobility Improvements for LTE", Nokia Siemens Networks et al., 3GPP TSG-RAN Meeting #51, RP-110438, Mar. 2011, 5 pgs.

"3rd Generation Partnership Project; Technical Specification Group Services and System Aspects; Telecommunication management; Automatic Neighbour Relation (ANR) management; Concepts and requirements (Release 11)", 3GPP TS 32.511 V11.0.0, Jun. 2011, 12 pgs.

(Continued)

*Primary Examiner* — Mahendra Patel
(74) *Attorney, Agent, or Firm* — Harrington & Smith

(57) ABSTRACT

A method includes receiving a first measurement configuration at a user equipment from a wireless communication network; making measurements using the first measurement configuration; in response to a condition being satisfied resulting from the measurements that are made, transmitting an indication that an allowed small cell has been detected; receiving a second measurement configuration at the user equipment from the wireless communication network; and making measurements of the allowed small cell using the second measurement configuration, where the first measurement configuration results in measurements being made less frequently than measurements made in accordance with the second measurement configuration. An apparatus configured to perform the method is also disclosed.

25 Claims, 9 Drawing Sheets

(56) References Cited

OTHER PUBLICATIONS

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.4.0, Jun. 2011, 194 pgs.

"3$^{rd}$ Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.2.0, Jun. 2011, 54 pgs.

"3$^{rd}$ Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.2.0, Jun. 2011, 294 pgs.

"3$^{rd}$ Generation Partnership Project; Technical Specification Group Radio Access Network; Evolved Universal Terrestrial Radio Access (E-UTRA); Requirements for support of radio resource management (Release 10)", 3GPP TS 36.133 V 10.3.0, Jun. 2011, 457 pgs.

Wen-Tsuen Chen et al. 'An adaptive scheme for vertical handoff in wireless overlay networks'. In: Proceedings of the Tenth International Conference on Parallel and Distributed Systems (ICPADS'04). IEEE, 2004 (Jul. 7, 2004), p. 541-548.

Nokia Siemens Networks et al. 'Enhancements for Small Cell Detection'. 3GPP (third Generation Partnership Project) draft. 3GPP TSG-RAN WG2 Meeting #77, Dresden, Germany, Feb. 6-10, 2012. Doc. R2-120523 (published on Jan. 31, 2012).

\* cited by examiner

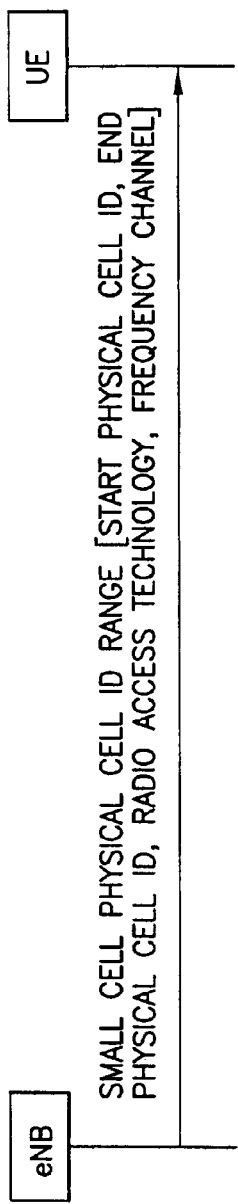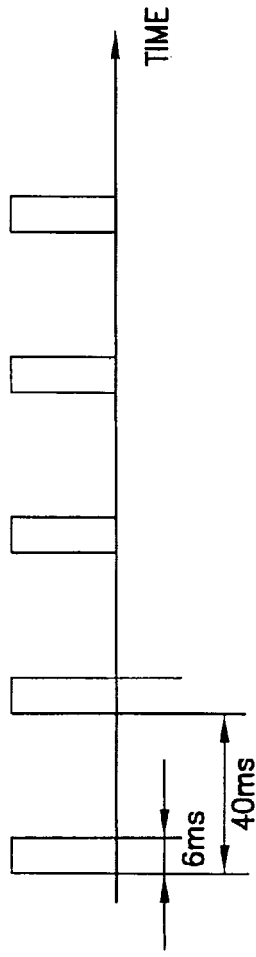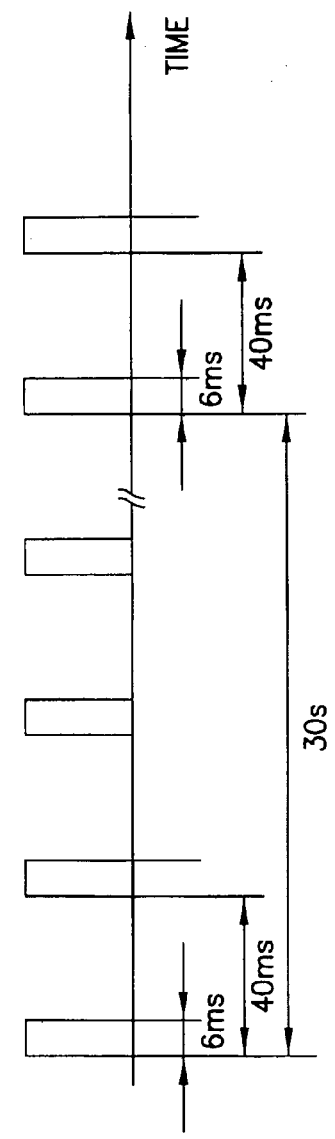
FIG.7B
FIG.8

METHOD AND APPARATUS PROVIDING MULTI-LEVEL PROXIMITY INDICATION AND SMALL CELL DISCOVERY

TECHNICAL FIELD

The exemplary and non-limiting embodiments of this invention relate generally to wireless communication systems, methods, devices and computer programs and, more specifically, relate to cellular system mobility procedures, such as those performed in UTRAN and E-UTRAN, and relate even more specifically to mobility procedures used with small cells such as pico cell or home enhanced NodeBs (HeNBs), also referred to as femtocells, and to techniques adapted to facilitating user equipment (UE) discovery of such cells.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
ANR automatic neighbour relation
ASF autonomous search function
BS base station
CSG closed subscriber group
DL downlink (eNB towards UE)
DRx discontinuous reception
eNB E-UTRAN Node B (evolved Node B)
EPC evolved packet core
E-UTRAN evolved UTRAN (LTE)
HeNB home eNB
HO handover
IMTA international mobile telecommunications association
ITU-R international telecommunication union-radiocommunication sector
LTE long term evolution of UTRAN (E-UTRAN)
LTE-A LTE advanced
MAC medium access control (layer 2, L2)
MM/MME mobility management/mobility management entity
OFDMA orthogonal frequency division multiple access
O&M operations and maintenance
PCI physical cell identifier
PDCP packet data convergence protocol
PHY physical (layer 1, L1)
PSC packet scheduling
RAT radio access technology
Rel release
RLC radio link control
RRC radio resource control
RRM radio resource management
SGW serving gateway
SI system information
SC-FDMA single carrier, frequency division multiple access
UE user equipment, such as a mobile station, mobile node or mobile terminal
UL uplink (UE towards eNB)
UPE user plane entity
UTRAN universal terrestrial radio access network One modern communication system is known as evolved UTRAN (E-UTRAN, also referred to as UTRAN-LTE or as E-UTRA),In this system the DL access technique is OFDMA, and the UL access technique is SC-FDMA.

One specification of interest is 3GPP TS 36.300, V10.4.0 (2011-06), 3rd Generation Partnership Project; Technical Specification Group Radio Access Network; Evolved Universal Terrestrial Radio Access (E-UTRA) and Evolved Universal Terrestrial Access Network (EUTRAN); Overall description; Stage 2 (Release 10), referred to for simplicity hereafter as 3GPP TS 36.300. Another specification of interest is 3GPP TS 36.331 V10.2.0 (2011-06) Technical Specification 3rd Generation Partnership Project; Technical Specification Group Radio Access Network; Evolved Universal Terrestrial Radio Access (E-UTRA); Radio Resource Control (RRC); Protocol specification (Release 10).

FIG. 1A reproduces FIG. 4.1 of 3GPP TS 36.300 and shows the overall architecture of the EUTRAN system (Rel-8). The E-UTRAN system includes eNBs, providing the E-UTRAN user plane (PDCP/RLC/MAC/PHY) and control plane (RRC) protocol terminations towards the UEs. The eNBs are interconnected with each other by means of an X2 interface. The eNBs are also connected by means of an S1 interface to an EPC, more specifically to a MME by means of a S1 MME interface and to a S-GW by means of a S1 interface (MME/S-GW 4). The S1 interface supports a many-to-many relationship between MMEs/S-GWs/UPEs and eNBs.

The eNB hosts the following functions:
functions for RRM: RRC, Radio Admission Control, Connection Mobility Control,
Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

Also of particular interest herein are further releases of 3GPP LTE targeted towards future IMT-A systems, referred to herein for convenience simply as LTE-Advanced (LTE-A). A goal of LTE-A is to provide significantly enhanced services by means of higher data rates and lower latency with reduced cost. LTE-A is directed toward extending and optimizing the 3GPP LTE Rel-8 radio access technologies to provide higher data rates at lower cost. LTE-A will be a more optimized radio system fulfilling the ITU-R requirements for IMT-Advanced while maintaining backwards compatibility with LTE Rel-8.

A problem relates to small cell discovery and measurement triggering, where by small cells what is generally meant are picocells or HeNB cells. Under current 3GPP assumptions the UE should be able to detect (discover) allowed and earlier visited CSG/hybrid cells using an implementation-specific Autonomous Search Function (ASF). This function is currently specified in a vague manner and the details of this function are left to individual implementations. However, 3GPP is now working towards improving small cell discovery and proximity indications (thus also improving the ASF). Reference in this regard can be made to, for example, 3GPP TSG-RAN Meeting #51, RP-110438, Kansas City, US, Mar. 15-18, 2011, Source: Nokia Siemens Networks, Nokia Corporation, Alcatel-Lucent; Title: New work item proposal for Hetnet Mobility Improvements for LTE, Agenda Item: 14.1.

The challenge that is presented is how should a UE, in the (RRC) connected mode, find a previously discovered and allowed CSG/hybrid cell. Ideally this additional UE task should not lead to a noticeable increase in the signaling load, UE battery power consumption, nor should it have a negative impact on any potentially ongoing data transmission such as, for example, requiring a lower data rate to be used. Under current assumptions the UE is to perform the needed measurements in an implementation specific way, and once a cell has been discovered the network should be notified via a proximity indication message. Based on this message the network configures the UE with an appropriate measurement configuration (on the indicated carrier) and from that time forward then standardized measurement rules are used.

By way of background, reference can be made to Section 10.5.1.2, RRC_CONNECTED, of 3GPP TS 36.300. As is currently specified, while the UE is in the RRC_CONNECTED state the UE performs normal measurement and mobility procedures based on configuration provided by the network. The UE is not required to support manual selection of CSG IDs while in RRC_CONNECTED state.

Handover to a HNB/HeNB follows the framework of UE assisted network controlled handover as described in Section 10.1.2.1. Handover to a HNB/HeNB is different from the normal handover procedure in three aspects:

1. Proximity Estimation: in case the UE is able to determine, using autonomous search procedures, that it is near a CSG or hybrid cell whose CSG ID is in the UE's CSG white list, the UE may provide to the source eNB an indication of proximity. The proximity indication may be used as follows:

If a measurement configuration is not present for the concerned frequency/RAT, the source eNB may configure the UE to perform measurements and reporting for the concerned frequency/RAT.

The source eNB may determine whether to perform other actions related to handover to HNB/HeNBs based on having received a proximity indication (for example, the source eNB may not configure the UE to acquire system information of the HNB/HeNB unless it has received a proximity indication).

2. PSC/PCI Confusion: due to the typical cell size of HNB/HeNBs being much smaller than macro cells, there can be multiple HNBs/HeNBs within the coverage of the source eNB that have the same PSC/PCI. This leads to a condition referred to as PSC/PCI confusion, wherein the source eNB is unable to determine the correct target cell for handover from the PSC/PCI included in the measurement reports from the UE. PSC/PCI confusion is solved by the UE reporting the global cell identity of the target HNB/HeNB.

3. Access Control: if the target cell is a hybrid cell, prioritization of allocated resources may be performed based on the UE's membership status. Access control is done by a two step process, where first the UE reports the membership status based on the CSG ID received from the target cell and the UE's CSG white list, and then the network verifies the reported status.

Mobility from eNB/HeNB to a HeNB CSG/hybrid cell takes place with the S1 Handover procedure. In the following call flow the source cell can be an eNB or a HeNB.

The procedure applies to any scenario where the CSG ID is provided by the UE or provided by the source eNB.

Reference can be made to FIG. 1B, which reproduces FIG. 10.5.1.2-1 "Mobility to HeNBs CSG and hybrid cells" from 3GPP TS 36.300. The enumerated steps and procedures in FIG. 1B are described as follows.

1) The source eNB configures the UE with proximity indication control.
2) The UE sends an "entering" proximity indication when it determines it may be near a cell (based on autonomous search procedures) whose CSG ID is in the UE's CSG white list. The proximity indication includes the RAT and frequency of the cell.
3) If a measurement configuration is not present for the concerned frequency/RAT the source eNB configures the UE with relevant measurement configuration including measurement gaps as needed, so that the UE can perform measurements on the reported RAT and frequency. The network may also use the proximity indication to minimize the requesting of handover preparation information of CSG/hybrid cells by avoiding requesting such information when the UE is not in the geographical area where cells whose CSG IDs are in the UEs CSG White-list are located.
4) The UE sends a measurement report including the PCI (e.g., due to triggered event A3).
5) The source eNB configures the UE to perform SI acquisition and reporting of a particular PCI.
6) The UE performs SI acquisition using autonomous gaps, i.e., the UE may suspend reception and transmission with the source eNB within the limits defined in 3GPP TS 36.133 to acquire the relevant system information from the target HeNB.
7) The UE sends a measurement report including (E-)CGI, TAI, CSG ID and "member/non-member" indication.
8) The source eNB includes the target E-CGI and the CSG ID in the Handover Required message sent to the MME. If the target is a hybrid cell the Cell Access Mode of the target is included.
9) The MME performs UE access control to the CSG cell based on the CSG ID received in the Handover Required message and the stored CSG subscription data for the UE. If the access control procedure fails, the MME ends the handover procedure by replying with the Handover Preparation Failure message. If the Cell Access Mode is present, the MME determines the CSG Membership Status of the UE handing over to the hybrid cell and includes it in the Handover Request message.
10-11) The MME sends the Handover Request message to the target HeNB including the target CSG ID received in the Handover Required message. If the target is a hybrid cell the CSG Membership Status will be included in the Handover Request message.
12) The target HeNB verifies that the CSG ID received in the Handover Request message matches the CSG ID broadcast in the target cell and if such validation is successful it allocates appropriate resources. UE prioritization may also be applied if the CSG Membership Status indicates that the UE is a member.
13-14) The target HeNB sends the Handover Request Acknowledge message to the MME via the HeNB GW if present.
15) The MME sends the Handover Command message to the source eNB.
16) The source eNB transmits the Handover Command (RRC Connection Reconfiguration message including mobility control information) to the UE.

NOTE: Steps 1-9, 15 and 16 also apply to inter-RAT mobility from LTE to HNB.

After sending an "entering" proximity indication (step 2), if the UE determines that it is no longer near a cell whose CSG ID is in the UE's CSG white list, the UE sends a "leaving"

proximity indication to the source eNB. Upon reception of this indication, the source eNB may reconfigure the UE to stop measurements on the reported RAT and frequency.

In the above procedure as currently specified in 3GPP TS 36.300 steps 2 and 3 may not be performed in case the UE has not previously visited the HeNB, e.g., when the UE first visits a hybrid cell.

The PCI confusion is said to be resolved by steps 5, 6 and 7. The source eNB can request SI acquisition and reporting for any PCI, not limited to PSCs/PCIs of CSG or hybrid cells.

SUMMARY

In a first aspect thereof the exemplary embodiments of this invention provide a method that comprises receiving a first measurement configuration at a user equipment from a wireless communication network; making measurements using the first measurement configuration; in response to a condition being satisfied resulting from the measurements that are made, transmitting an indication that an allowed small cell has been detected; receiving a second measurement configuration at the user equipment from the wireless communication network; and making measurements of the allowed small cell using the second measurement configuration, where the first measurement configuration results in measurements being made less frequently than measurements made in accordance with the second measurement configuration.

In a further aspect thereof the exemplary embodiments of this invention provide an apparatus that comprises a processor and a memory including computer program code. The memory and computer program code are configured, with the processor, to cause the apparatus at least to receive a first measurement configuration at a user equipment from a wireless communication network, to make measurements using the first measurement configuration, in response to a condition being satisfied resulting from the measurements that are made, to transmit an indication that an allowed small cell has been detected, to receive a second measurement configuration at the user equipment from the wireless communication network and to make measurements of the allowed small cell using the second measurement configuration, where the first measurement configuration results in measurements being made less frequently than measurements made in accordance with the second measurement configuration.

In a still further aspect thereof the exemplary embodiments of this invention provide a method that comprises configuring a user equipment operating in a cell of a network access node to make small cell measurements using a first measurement configuration; receiving an indication from the user equipment that an allowed small cell has been detected; and configuring the user equipment to make additional small cell measurements using a second measurement configuration. In the method the first measurement configuration results in measurements being made less frequently than measurements made in accordance with the second measurement configuration.

BRIEF DESCRIPTION OF THE DRAWINGS

In the attached Drawing Figures:

FIGS. 6, 7A, 7B and 8 provide an overview of the measurement technique disclosed in PCT/EP2011/056601.

DETAILED DESCRIPTION

The exemplary embodiments of this invention overcome the problems that are created when the UE is granted an implementation-specific freedom to perform the initial small cell search, as situations can arise where the network cannot rely on the accuracy of the proximity indications received from the UE. As a result the network may in one case be flooded with unnecessary proximity messages, as the UE may start making excessive measurements potentially causing the subscriber to suffer an impaired user experience. Another issue that is addressed is the unreliability and unpredictability of the proximity indication that can arise from different implementation-specific solutions. The exemplary embodiments of this invention provide in one aspect thereof a technique to improve (and standardize) the connected mode measurement procedures involved in small cell discovery.

The exemplary embodiments of this invention provide a novel method that employs a multi-level measurement approach for small cell proximity detection and discovery.

Figure 1A:
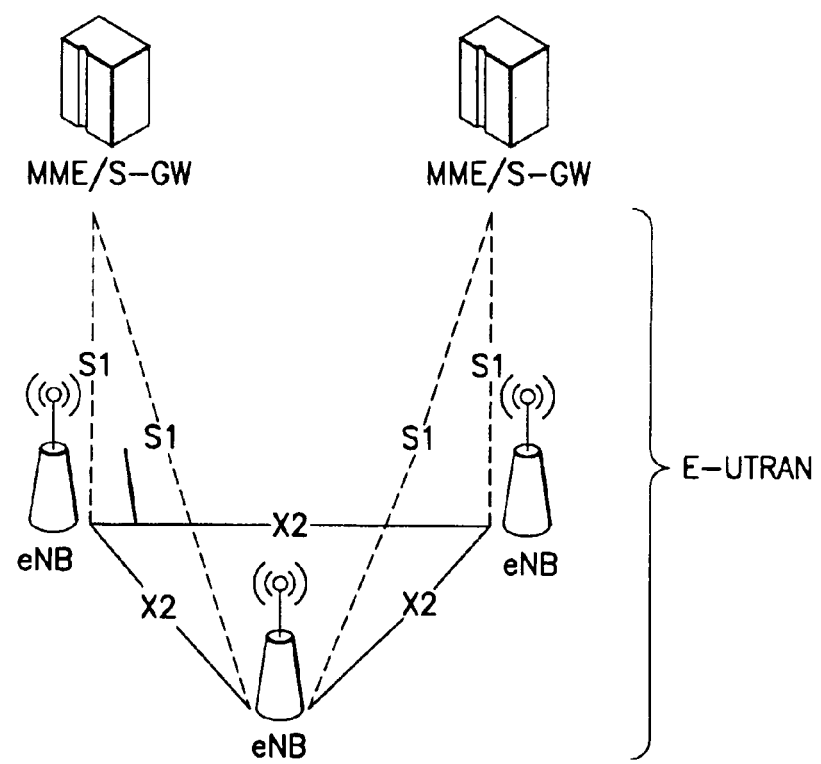
FIG. 1A reproduces FIG. 4.1 of 3GPP TS 36.300, and shows the overall architecture of the EUTRAN system.
Figure 2:
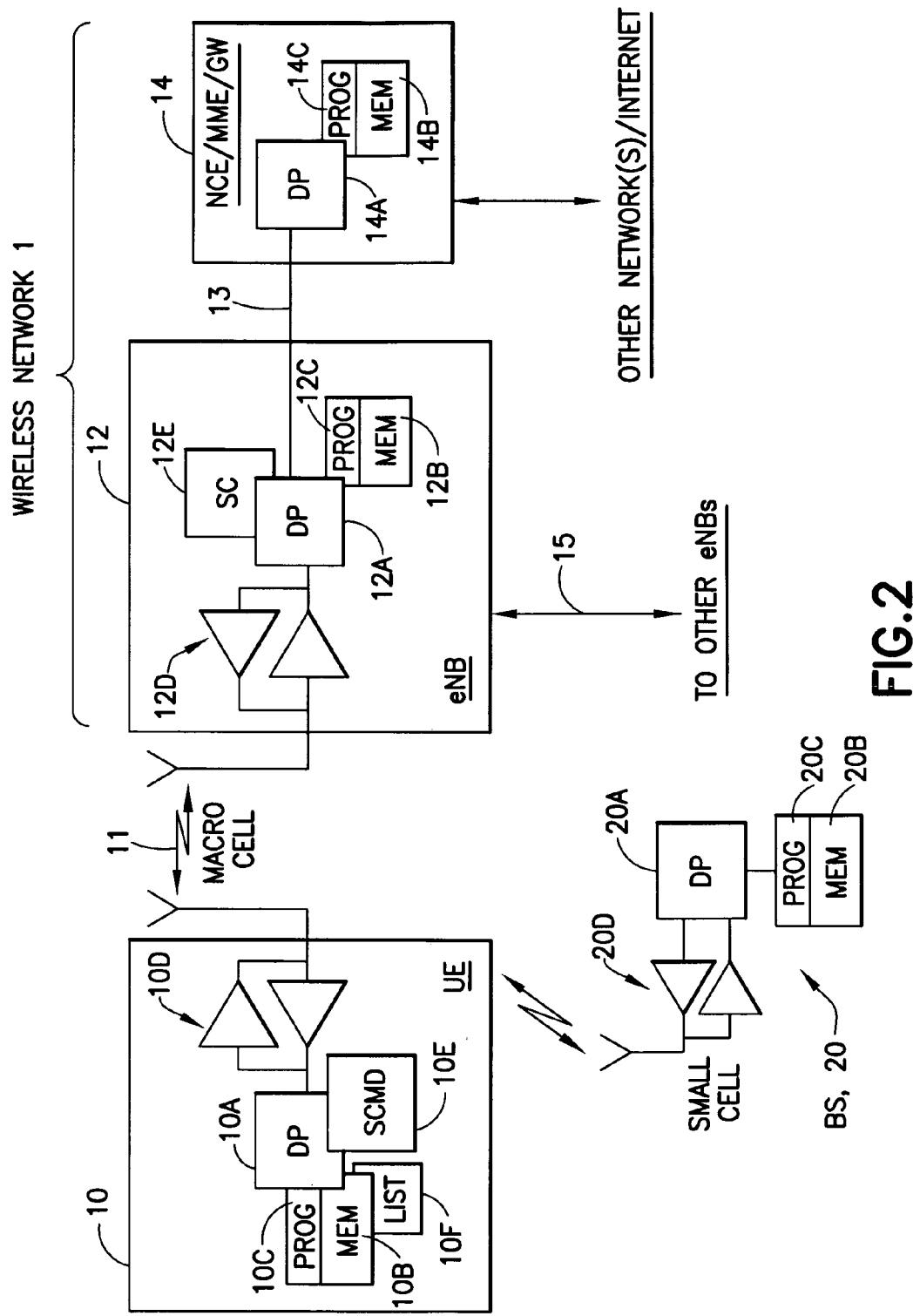
FIG. 2 shows a simplified block diagram of various electronic devices that are suitable for use in practicing the exemplary embodiments of this invention.

Before describing in further detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a wireless link 11 with an apparatus, such as a mobile communication device which may be referred to herein as a terminal or as a UE 10, via a network access node, such as a Node B (base station), and more specifically an eNB 12. The network 1 may include a network control element (NCE) 14 that may include the MME/SGW functionality shown in FIG. 1A, and which provides connectivity with a further network, such as a telephone network and/or a data communications network (e.g., the internet). The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transmitter and receiver pair (transceiver) 10D for bidirectional wireless communications with the eNB 12 via one or more antennas. The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas (typically several when multiple input/ multiple output (MIMO) operation is in use). The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

Also shown is base station (BS) 20 that supports a 'small cell', such as a HeNB cell. It should be noted that a CSG cell is an Access Mode configuration type of a HeNB cell. For example, a HeNB cell can operate with one of three access modes: open, hybrid or closed. In the case of closed access mode the HeNB cell is accessible only by predefined closed subscriber group (CSG) subscribers. The exemplary embodiments of this invention are operable with HeNB cells, whether configured in the closed or hybrid access modes, configured with a CSG-ID for which the relevant subscriber/UE has access rights.

The BS 20 (e.g., HeNB) can be constructed in a somewhat similar manner to the eNB 12, and is assumed to also include at least one computer or a data processor 20A, at least one computer-readable memory medium embodied as a memory 20B that stores a program of computer instructions 20C, and at least one suitable RF transceiver 20D for communication with the UE 10 via one or more antennas.

For the purposes of describing the exemplary embodiments of this invention the UE 10 may be assumed to also include a small cell measurement and detection (SCMD) functionality 10E that operates in conjunction with the other UE components, including the program 10C, in accordance with the exemplary embodiments of this invention. The eNB 12 can be assumed to include a compatible small cell (SC) functionality 12E for receiving and operating on level one and level two messages (as described below, e.g., see FIG. 5). The UE 10 can also be assumed to store at least one list 10F of allowed small cells, e.g., allowed CSG cells). This type of list is typically referred to as a 'white list' to distinguish it from another list that may be present which indicates those cells that the UE 10 is barred from accessing.

The programs 10C and 12C are assumed to include program instructions that, when executed by the associated data processor, enable the device to operate in accordance with the exemplary embodiments of this invention, as will be discussed below in greater detail. In general, the exemplary embodiments of this invention may be implemented at least in part by computer software executable by the DP 10A of the UE 10 and the DP 12A of the eNB 12, or by hardware, or by a combination of software and hardware (and firmware).

The various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or UE 10s that incorporate combinations of such functions.

The computer-readable memories 10B, 12B and 20B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A, 12A and 20A may be of any type suitable to the local technical environment, and may include one or more of general purpose computers, special purpose computers, microprocessors, digital signal processors (DSPs) and processors based on multi-core processor architectures, as non-limiting examples.

An aspect of the exemplary embodiments of this invention is an extension of the current procedure for indicating proximity of an allowed CSG/hybrid cell with another stage (level), and so to create two level 'proximity indications'. Each level of proximity indications triggers a different measurement configuration or potentially a pre-configured set of measurements corresponding to different measurements intervals, battery power consumption and network/UE impact.

More specifically, the exemplary embodiments provide the following features.

1) A first level of proximity indication, which is sent by the UE 10 to the network 1 in a case where the UE 10 is able to determine, with a basic (approximate) resolution (e.g., based on only one macro cell coverage, or based on an out-bound HO from its allowed CSG/hybrid cell) that an allowed CSG/hybrid cell might be located in a particular area, i.e., in the vicinity of the current location of the UE 10. This 'level one' proximity indication message triggers in the network 1 a measurement configuration message which enables the UE 10 to perform low-frequency (low rate/activity) measurements and cell detection, i.e., a sequence of measurements with relatively long intervals between measurement occasions. The purpose of these low frequency cell detection measurements is to enable the UE 10 to perform cell detection and measurements on an indicated carrier in a low-effort manner, while still enabling the UE 10 to discover its allowed CSG/hybrid cell. These measurements could be performed as described in PCT/EP2011/056601. FIGS. 6, 7A, 7B and 8, discussed below, provide an overview of the measurement technique described in PCT/EP2011/056601.

2) A second level of proximity indication, which can be triggered once the UE 10 has detected a cell with a PCI matching the allowed CSG/hybrid cells (or considered to be close to that cell) as a result of first level of proximity indication/measurements. This procedure can be executed as currently standardized (see FIG. 1B and the corresponding description of same above), or alternatively performed using event triggered reporting. The result of the second level proximity indication is to allow for more accurate measurements of the detected cell, i.e., triggering the UE 10 to perform measurements on the indicated frequency such as by using one of the already defined measurement gap patterns. While the first level measurements can be performed rather infrequently (e.g., once per a minute), the second level measurements are performed more frequently, thereby allowing the UE 10 to start utilizing the CSG/hybrid cell for offloading traffic without unnecessary delay due to a slow measurement cycle.

As a non-limiting example of the frequency of making of second level measurements reference can be made to 3GPP TS 36.133 V10.3.0 (2011-06) Technical Specification 3rd Generation Partnership Project; Technical Specification Group Radio Access Network; Evolved Universal Terrestrial Radio Access (E-UTRA); Requirements for support of radio resource management (Release 10), in particular section 8.1.2.3.1.1 "E-UTRAN FDD-FDD inter frequency measurements when no DRX is used".

By extending the proximity indication and measurement procedures into a two level or two stage technique the UE 10 is first configured with low-frequency measurements in areas where it is likely that an allowed CSG/hybrid or pico cell might be located. This enables the UE 10 to perform "background" measurements only when a possibility that a small cell might exist, as opposed to performing measurements at all times. Additionally, measurements induced by the first level of proximity indication can be truly "background" measurements as described in PCT/EP2011/056601, thus requiring minimal effort by the UE 10 and thus incurring little interruption in data-transmission and conserving battery power. Then, once the UE 10 as a result of the low-frequency measurements detects the proximity of an allowed CSG/hybrid or pico cell (e.g., the UE 10 detects a cell with a PCI matching that of an entry in the UEs allowed white list of cells) it indicates the proximity using, for example, the currently standardized procedure. As a result another measurement configuration is given to the UE 10 by the eNB 12, one that enables a thorough measurement of the detected cell.

The use of this procedure overcomes the problems discussed above. For example, since the first level measurements consume a relatively smaller amount of UE battery and radio resources, the measurements can be triggered more readily than what present procedures allow (with only a single level of proximity indications). This leads to faster or more frequent utilization of the CSG/hybrid cells and simplifies the design and specification of algorithms for triggering the measurements.

In addition, the accuracy of the measurements is increased through the triggering of the 'second level' proximity indication only when the UE 10 has already detected evidence of a cell of interest by the 'first level' measurements, e.g., the UE 10 has detected a cell with a matching PCI.

In addition, the 'first level' measurements are performed in a standardized manner (and not left to various implementation-specific techniques) and thus result in a more reliable behavior and aid in providing a more accurate overall functionality. Additionally, since the 'first level' of measurements have an impact on the 'second level' proximity indication accuracy this has a benefit for the network 1 in making the messages more reliable and thus reducing network 1 signaling overhead (for example, by reducing the number of UE 10 measurement reports sent to the eNB 12.)

Furthermore the UE 10 performs in general fewer measurements since the 'first level' measurements are triggered only in particular generally specific areas and, additionally, they require less effort by the UE 10. Also the 'second level' measurements are performed only in more specific areas due to the 'first level' initial measurements that indicate that the UE 10 has actually detected a cell which, with high probability, is an allowed cell. Reducing the overall number of needed measurements (due to making them more accurate) clearly has a beneficial effect on extending the battery life of the UE 10.

Assume that the UE 10 is a CSG-capable UE with a valid entry in its CSG white list, and assume further that the UE 10 ASF has already recorded the location of, for example, an allowed CSG cell or pico cell. The exact manner by which the location of a cell is stored by the UE 10 can take any of a number of forms, such as by storing GPS-derived location coordinates in the memory 10B, or storing an ID of a macro-cell (one supported by the eNB 12) that is known to contain a small cell of interest to the UE 10.

Assuming that the UE 10 has stored an allowed CSG or pico cell (and its location) it is then desirable that the UE 10 "finds" this cell once in the RRC connected mode. In order to achieve this goal the UE 10 first triggers the sending of a 'first level' of proximity indication message to the network 1. This could be based on one of several factors such as, but not limited to (as examples): a location determining sub-system of the UE 10 (e.g., one that provides GPS coordinates), or the UE 10 enters a macro cell RF coverage area that corresponds to a pre-stored macro cell with a stored RF fingerprint. Alternatively, the UE 10 may have just handed-out of a home CSG cell (home small cell) and thus it is likely that it may return to that cell after some period of time.

The concept of the 'RF fingerprint' may be defined as a set of RF signals (carriers) and powers that a UE experiences in a certain location. The UE 10 can memorize that, for example, in some certain location A some set of RF signals exist with, e.g., a given PCI and a given signal strength. This information can be used then in a reverse manner: the UE 10 can assume that it is in location A based on the currently experienced (measured) RF signal(s) matching a stored set of RF signals (the 'RF fingerprint' of location A).

The 'level one' proximity indication message indicates to the network 1 an existence of a carrier where the possible cell of interest is located. However, the UE 10 may also be configured with 'level one' measurements by the network 1 itself, without UE effort (i.e., without the UE 10 first indicating proximity of, for example, an allowed CSG cell by transmitting the proximity indication message). This could be a result of, for example, the UE 10 entering a macro/pico cell coverage area of which the network 1 (e.g., the eNB 12 and/or MME) is aware that there are several pico/femto cells deployed. A cell could possess this information due to, e.g., ANR functionality.

Reference with regard to ANR functionality can be made to, for example, 3GPP TS 36.300 sections 22.3.2a "Automatic Neighbour Relation Function", 22.3.3 "Intra-LTE/frequency Automatic Neighbour Relation Function", and 22.3.4 "Inter-RAT/Inter-frequency Automatic Neighbour Relation Function". Reference with regard to ANR functionality can also be made to, for example, 3GPP TS 32.511 V11.0.0 (2011-06) Technical Specification 3rd Generation Partnership Project; Technical Specification Group Services and System Aspects; Telecommunication management; Automatic Neighbour Relation (ANR) management; Concepts and requirements (Release 11).

Alternatively, the UE 10 enters a macro/pico cell coverage area that is adjacent to other pico/femto cells. Similarly, as described above, one cell could be made aware of the existence of the other cell by means of, for example, ANR functionality.

Figure 3:
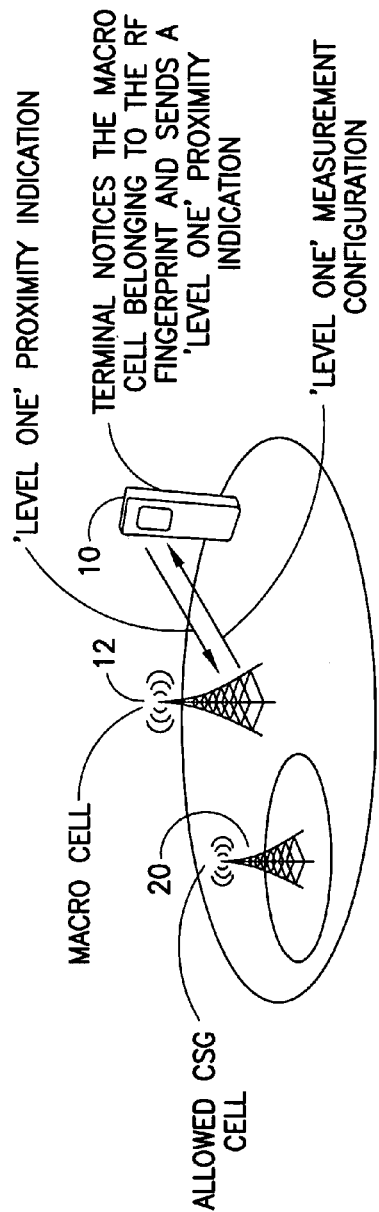
FIG. 3 shows a condition where the UE detects a macro cell RF coverage forming a stored RF fingerprint and thus triggers a 'level one' proximity indication message to obtain a 'level one' measurement configuration.

In any case, the network 1 configures the UE 10 with 'low-frequency' measurements, e.g., as described in PCT/EP2011/056601. This is shown in FIG. 3, where there is a condition where the UE 10 detects a macro cell RF coverage area that corresponds to a stored RF fingerprint and thus triggers a 'level one' proximity indication message to obtain a 'level one' measurement configuration from the network 1.

Figure 4:
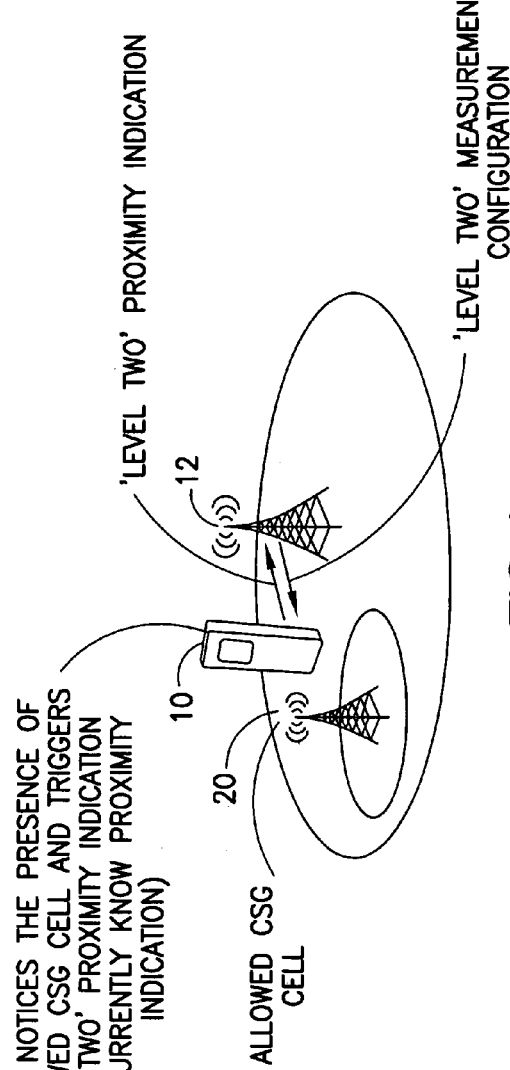
FIG. 4 shows a condition where the UE detects, based on the 'level one' (level 1), low-frequency measurements, an allowed CSG cell and triggers a 'level two' (level 2) proximity indication to obtain a 'level two' measurement configuration.

As the UE 10 can be moving within the RF coverage of the macro cell established by the eNB 12 it may reach the vicinity of its allowed CSG cell 20 and detects the presence of the allowed CSG cell via the already configured 'level one' measurements. In that case the UE 10 sends to the network 1 a 'level two' proximity indication that triggers a measurement configuration message as currently standardized (e.g., as in FIG. 1B). Based on the more detailed, higher frequency measurements the CSG cell is measured and reported using the currently standardized procedures. This is shown in FIG. 4, where the UE 10 detects, based on the 'level one', low-frequency measurements, the allowed CSG cell 20 and triggers the 'level two' proximity indication to obtain a 'level two' measurement configuration from the network 1.

Figure 1B:
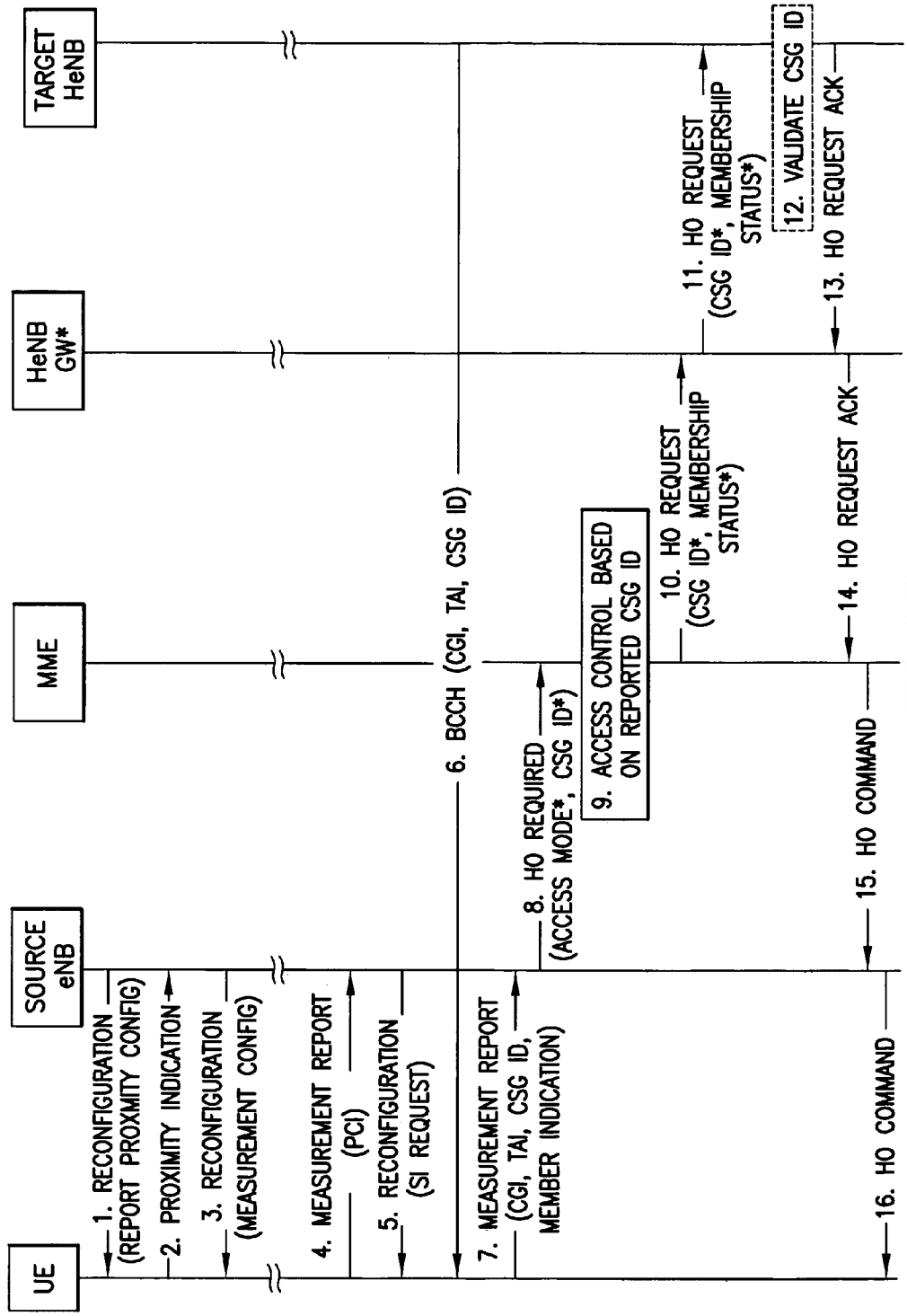
FIG. 1B reproduces FIG. 10.5.1.2-1 "Mobility to HeNBs CSG and hybrid cells" from 3GPP TS 36.300.
Figure 5:
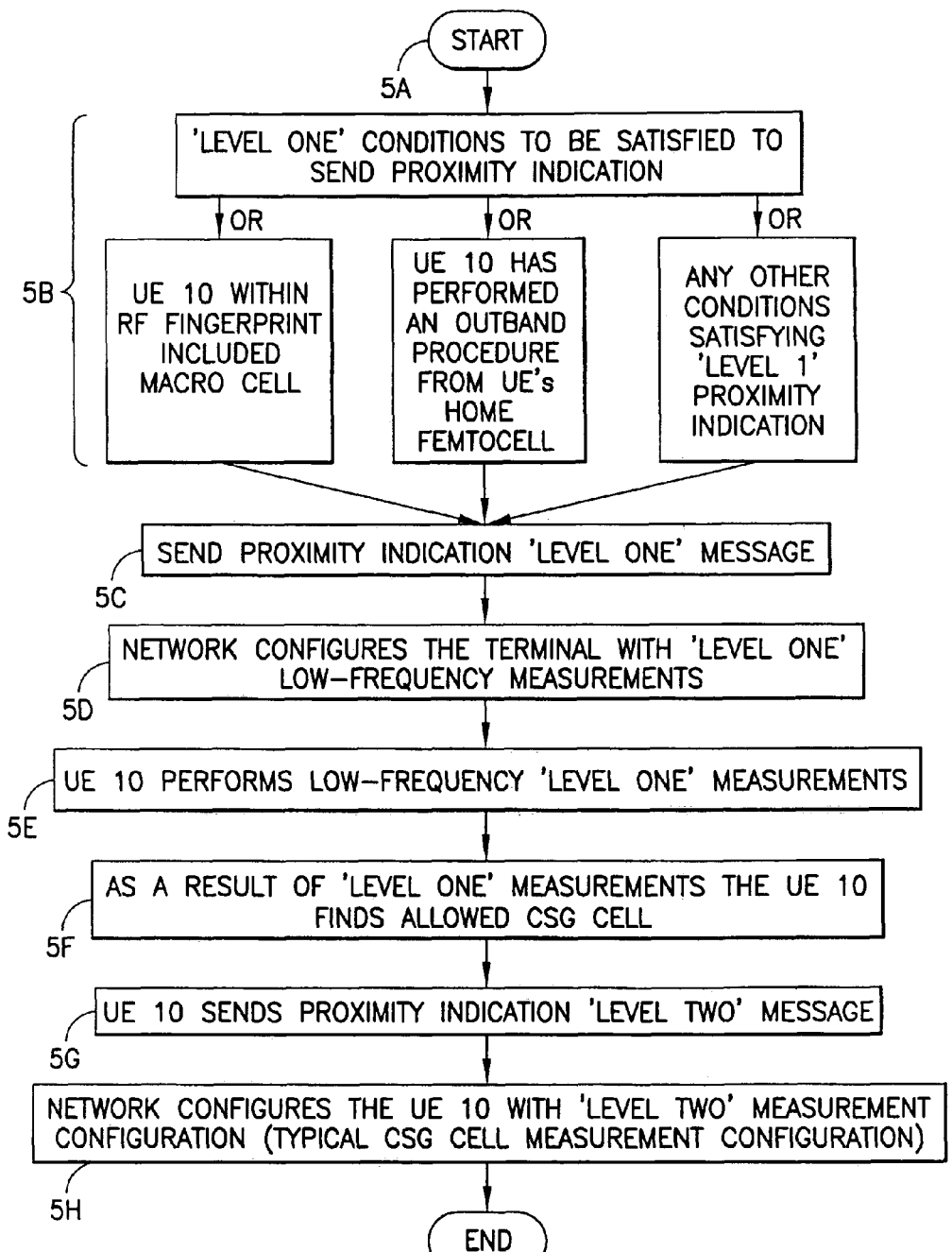
FIG. 5 shows an exemplary logic flow diagram that illustrates the operation of the UE with the network in accordance with the exemplary embodiments of this invention.

FIG. 5 shows an exemplary logic flow diagram that illustrates the operation of the UE 10 with the network 1 in accordance with the exemplary embodiments of this invention. The method shown in FIG. 5 begins at 5A. At 5B a determination is made by the UE 10 whether 'level one' condition or conditions are satisfied in order to send a proximity indication to the network 1. These conditions can include, for example, the detection of an RF fingerprint in the macrocell, that the UE 10 has performed an outbound procedure from the home femtocell, of in general any other condition that satisfies the level one proximity indication detection criterion or criteria. At 5C the UE 10 is triggered to transmit the proximity indication 'level one' message to the eNB 12. At 5D the network 1 configures the UE 10 with a low frequency level one measurement configuration, and at 5E the UE 10 performs level one measurements. Assuming at 5F that as a result of the UE 10 performing the level one measurements it detects an allowed CSG cell 20, at 5G the UE 10 is triggered to transmit the proximity indication 'level two' message to the eNB 12. At 5H the network 1 configures the UE 10 with the higher frequency level two measurement configuration (such as is illustrated in FIG. 1B) and the UE 10 initiates the performance of the level two measurements.

As should be appreciated, the use of the exemplary embodiments of this invention enables an improvement to be realized in the way small cell discovery can be performed. An important aspect of the exemplary embodiments is that the procedure can also be used for the discovery of pico cells, since the 'level one' measurements are suitable to discovering both HeNBs as well as pico cells.

In the exemplary case of the E-UTRAN specifications there can be defined a new measurement gap pattern, potentially a new event as well as a new set of performance requirements. Furthermore, new (RRC) message(s) can be defined to implement the exemplary embodiments. For example, one new message can be defined in which case the existing proximity indication can be used as the other level indication, or two new messages can be defined, one for each level ('level one' and 'level two').

The conditions for the 'level one' proximity indication can be standardized. In one case it is possible to allow the UE 10 to send directly the proximity indication for 'level two' measurements without sending first the 'level one' proximity indication. The directly sent 'level two' indication would function to inform the network 1 that the UE 10 had performed autonomous measurements on the CSG cell's carrier and detected its CSG cell's PCI in the neighborhood where the UE 10 was earlier connected to the cell. The direct 'level two' indication would differ from the presently defined proximity indication in that the triggering of same would not be directly a function of the UE 10 implementation. Instead the network 1 would know when receiving the 'level two' proximity indication that the UE 10 has detected its CSG cell's PCI. This approach preferably would have a new proximity indication message specified for level two so that the network 1 could distinguish whether the UE 10 has sent a 'level two' indication or has sent a 'legacy' proximity indication as in FIG. 1B.

In another embodiment the existing ('legacy') proximity indication can be used as the 'level one' and the network 1 would then configure level one measurements for certain UEs (e.g., Rel-11 or later UEs) and conventional normal measurements for prior release 'legacy' UEs (note that at the time of the RRC Connected mode of the UE 10 the eNB 12 will know the UE 10 capabilities). In this case only the Rel-11 UEs would be capable of sending the 'level two' indication. When receiving the 'level two' indication the network 1 would know that certain requirements are met and that the UE 10 has actually detected the small cell of interest and would in response configure the normal (more frequent) measurements and measurement gaps. With this approach, a Rel-11 UE could directly send the 'level two' indication as discussed above, and the network 1 would correctly interpret the receipt of same (there is no risk of confusion between the legacy proximity indication and the enhanced 'level two' indication as described herein).

Described now with respect to FIGS. 6, 7A, 7B and 8 is an overview of the measurement technique disclosed in PCT/EP2011/056601. Note that this is but one suitable technique for performing the less frequently made 'level one' measurements, and that one or more other techniques could be used as well.

The current inter-frequency measurement procedure is described in the above-referenced 3GPP TS 36.331 V10.2.0 (2011-06) Technical Specification 3rd Generation Partnership Project; Technical Specification Group Radio Access Network; Evolved Universal Terrestrial Radio Access (E-UTRA); Radio Resource Control (RRC); Protocol specification (Release 10), as well as in 3GPP TS 36.133 V10.3.0 (2011-06) Technical Specification 3rd Generation Partnership Project; Technical Specification Group Radio Access Network; Evolved Universal Terrestrial Radio Access (E-UTRA); Requirements for support of radio resource management (Release 10) and in 3GPP TS 36.321 V10.2.0 (2011-06) Technical Specification 3rd Generation Partnership Project; Technical Specification Group Radio Access Network; Evolved Universal Terrestrial Radio Access (E-UTRA); Medium Access Control (MAC) protocol specification (Release 10).

In the invention described in PCT/EP2011/056601 the UE 10 distinguishes between two different types of cells: Normal cells (macro and possibly micro, e.g. coverage layer); and Small cells (pico, HeNB and possibly micro, e.g., offloading layer). The target cell type (i.e., the searched type) determines how the inter-frequency measurements are performed by the UE 10. More specifically, the UE 10 uses the current inter-frequency measurement specification and triggers for normal cells, while if inter-frequency measurements for small cells are configured, the UE 10 measures small cells without triggers, or with a different (lower) trigger level than for normal cells. Further, the UE 10 may perform the measurements autonomously. Further, and since the UE 10 can perform inter-frequency measurements at all times, the measurements are made much less frequently than inter-frequency measurements for normal cells.

Figure 6:
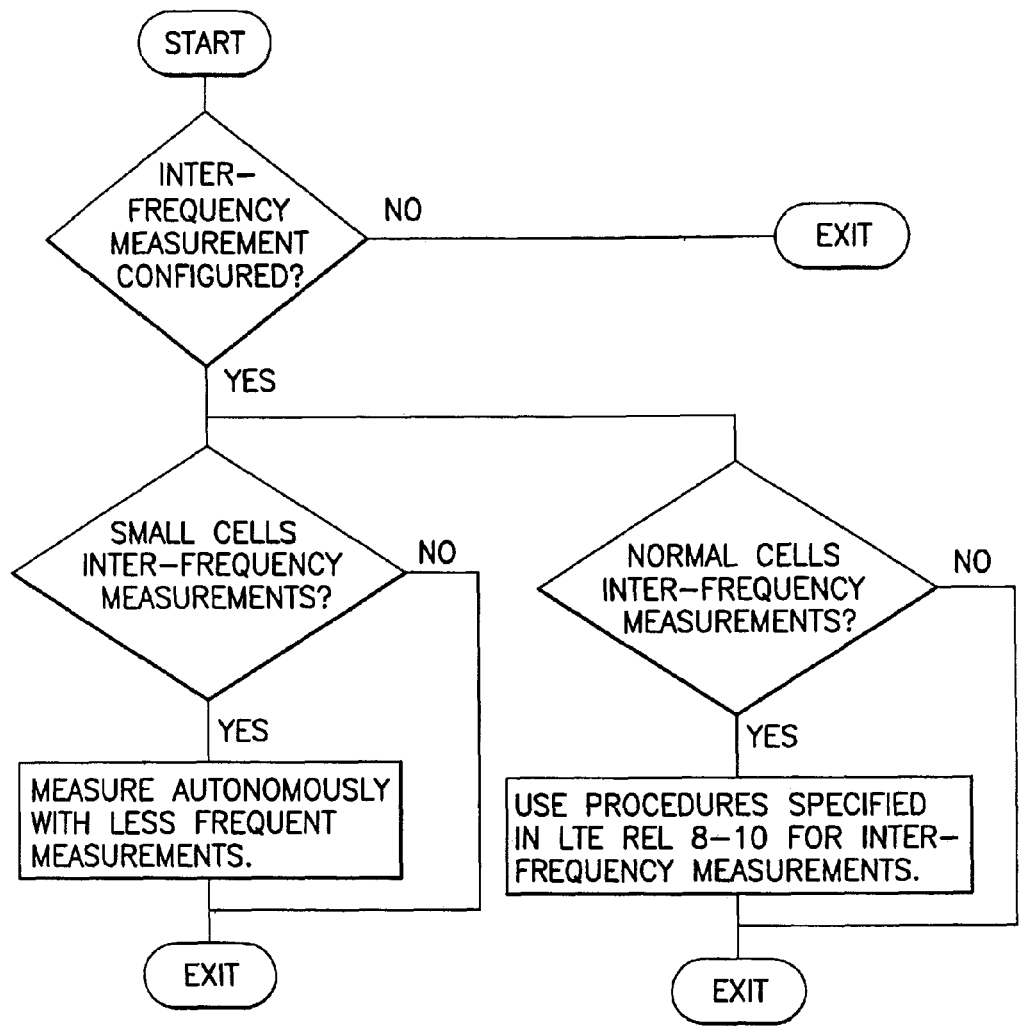

In the use of the invention described in PCT/EP2011/056601 the network 1 enables configuration of the UE 10 with measurements in such a way that the performance requirements of the different measurement targets (e.g., objects or Measurement IDs, etc.) are different. The UE 10 applies the configured measurements as illustrated in FIG. 6, which depicts the distinction between small cell and normal cell inter-frequency measurements.

The distinction between cells can be based on the use of two neighbor lists stored by the UE 10, or it can be based on the physical cell ID.

When configuring inter-frequency measurements, the UE 10 is informed about the cell types present on the carrier. The possible configurations can include: macro-cells only (use procedures specified in LTE Rel. 8-10), macro-cells (use procedures specified in LTE Rel. 8-10) and small cells (use the procedures described in PCT/EP2011/056601); and small cells only (use procedures described in PCT/EP2011/056601).

Figure 7A:
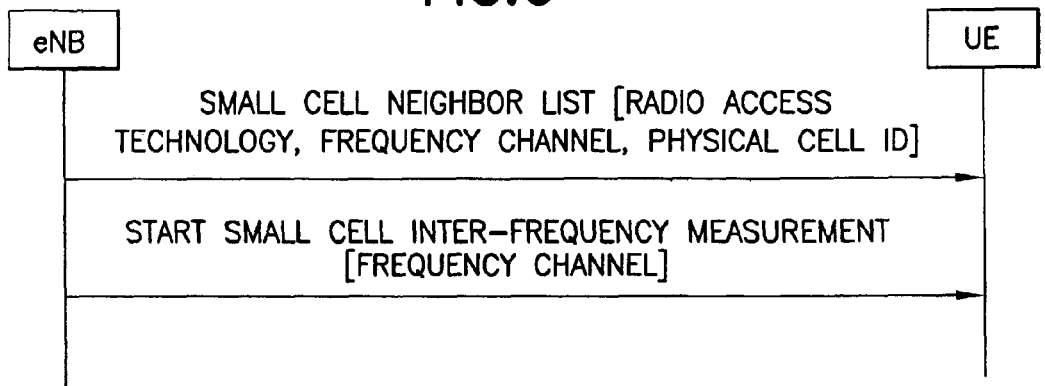

Alternatively, 3GPP could specify a dedicated message, e.g. 'start small cell inter-frequency measurement' which contains a list of carriers to be measured as illustrated by the second message in FIG. 7A.

Further, it is possible to provide the UE 10 implicitly with information about the type of cells present on the carrier. The distinction between cells can, for example, be accomplished based on two neighbor lists, or based on the physical cell ID.

In the first approach the UE 10 obtains two neighbor lists. One neighbor list contains macro cells and possibly micro cells where the UE 10 applies the currently specified inter-frequency measurements with the current measurement triggers. The second neighbor list contains small cells, e.g., pico cells and HeNB cells as shown in FIG. 7A. The second neighbor list also contains the carrier(s) used by the small cells.

In FIG. 7A there is shown the signaling of the small cell neighbor list to the UE 10. Note that some information can be optional. In this case the neighbor list contains the frequency channel and other necessary information, i.e., the UE 10 could begin measuring small cells immediately with this information, and a Start Measurement message could be omitted.

In the second approach, i.e., the use of reserved physical cell IDs for small cells, the UE 10 is signaled a range of physical cell IDs that are used by small cells (as illustrated in FIG. 7B, which shows that the eNB 12 signals to the UE 10 the physical cell IDs used by small cells.). The physical cell IDs are typically assigned by the Operation and Maintenance unit (O&M). The UE 10 can use the same configuration also in the case of a handover to a neighboring cell.

Discussed now is the use of measurement gap patterns for the UE 10 in active mode without DRx configured. Reference can be made to FIG. 8, where the upper portion illustrates one of the two currently specified measurement gap patterns for LIE in active mode without DRx (shown is one 6 ms gap with 40 ms periodicity, i.e., 5 gaps of 6 ms every 200 ms). The lower portion of FIG. 8 illustrates a measurement gap pattern for small cell measurements and cell detection in accordance with the embodiments of the invention described in PCT/EP2011/056601. The UE 10 receives, for example, 5 gaps of 6 ms repeated every 40 ms for 200 ms in active mode (the UE 10 obtains a block of, e.g., 4×6 ms measurement gaps every 30s). Thereafter the UE 10 would not need to perform any measurements for a longer defined period, and after this longer period, e.g., 1 minute; the UE 10 could have/receive another set of measurement gaps. In active mode, the UE 10 requires less measurement gaps and can receive a higher throughput.

Discussed now is the use of measurement gap patterns for the UE 10 in active mode with DRx configured. In this case, and if DRx is configured, the UE 10 performs one measurement in every DRx cycle. The maximum DRx cycle is 2 seconds and the UE 10 would perform a measurement at least every 5*Nf (number of frequencies to scan) times the DRx cycle length. In accordance with the embodiments of the invention described in PCT/EP2011/056601 there is established a different measurement requirement for inter-frequency measurements of small cells for the UE 10 in active mode with DRx configured. For example, instead of measuring every DRx cycle the UE 10 can instead be required to measure only the last, e.g., 5 DRx periods in each minute. The measurement requirement could be further relaxed to, for example, the last, e.g., 5 DRx periods every five minutes if a very long DRx cycle of, e.g., 2 seconds is configured.

As was noted above, the small cell measurement technique described by the embodiments of the invention of PCT/EP2011/056601 is but one suitable technique, and the exemplary embodiments of this invention are not limited for use with only this procedure as described above with reference to FIGS. 6, 7A, 7B and 8.

Based on the foregoing it should be apparent that the exemplary embodiments of this invention provide a method, apparatus and computer program(s) to enhance the measurements made by the UE 10, and the detection of small cells.

Figure 9:
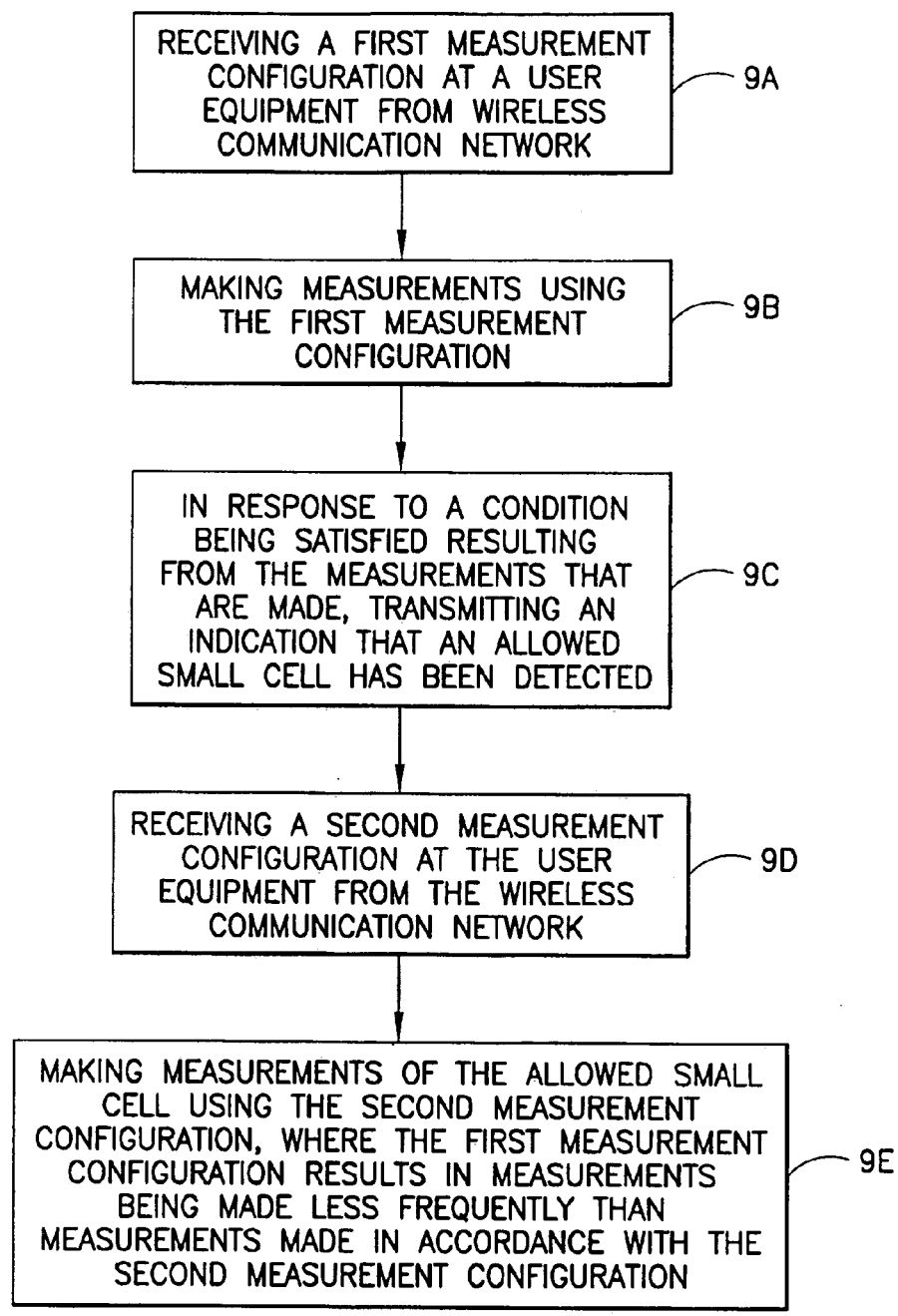
FIGS. 9 and 10 are each a logic flow diagram that illustrates the operation of a method, and a result of execution of computer program instructions embodied on a computer readable medium, in accordance with the exemplary embodiments of this invention.

FIG. 9 is a logic flow diagram that illustrates the operation of a method, and a result of execution of computer program instructions, in accordance with the exemplary embodiments of this invention. In accordance with these exemplary embodiments a method performs, at Block 9A, a step of receiving a first measurement configuration at a user equipment from a wireless communication network. At Block 9B there is a step of making measurements using the first measurement configuration. At Block 9C there is a step performed, in response to a condition being satisfied resulting from the measurements that are made, of transmitting an indication that an allowed small cell has been detected. At Block 9D there is a step of receiving a second measurement configuration at the user equipment from the wireless communication network. At Block 9E there is a step of making measurements of the allowed small cell using the second measurement configuration, where the first measurement configuration results in measurements being made less frequently than measurements made in accordance with the second measurement configuration.

In the method of FIG. 9 and the preceding paragraph, there is an initial step, performed in response to a precondition being satisfied, of transmitting a message from the user equipment to the wireless communication network, the message indicating proximity to a small cell.

In the method of FIG. 9 and the preceding paragraph, where the precondition comprises detecting a presence of an RF fingerprint that matches a stored RF fingerprint or the user equipment having performed an outbound procedure from a home small cell.

In the method of FIG. 9 and the preceding paragraphs, where the message comprises an identification of a frequency carrier, and where the first measurement configuration is configured to cause the user equipment to make measurements of the frequency carrier.

In the method of FIG. 9, where the first measurement configuration is received from the wireless communications network in response to a precondition being satisfied and without being requested by the user equipment.

In the method of FIG. 9 and the preceding paragraph, where the precondition comprises detection by the wireless communication network that the user equipment has entered a certain macrocell or small cell.

In the method of FIG. 9 and the preceding paragraphs descriptive of FIG. 9, where the small cell is one of a picocell or a home eNB cell, and where the condition that is satisfied comprises detecting an allowed picocell or home eNB cell configured with closed or hybrid access mode.

In the method of FIG. 9 and the preceding paragraphs descriptive of FIG. 9, where the small cell is a closed subscriber group cell, and where the condition that is satisfied comprises detecting a closed group subscriber cell having an identity found in a white list of the user equipment.

In the method of FIG. 9 and the preceding paragraphs descriptive of FIG. 9, where the steps of transmitting and receiving are accomplished in a macrocell having an area in which the small cell is located.

Figure 10:
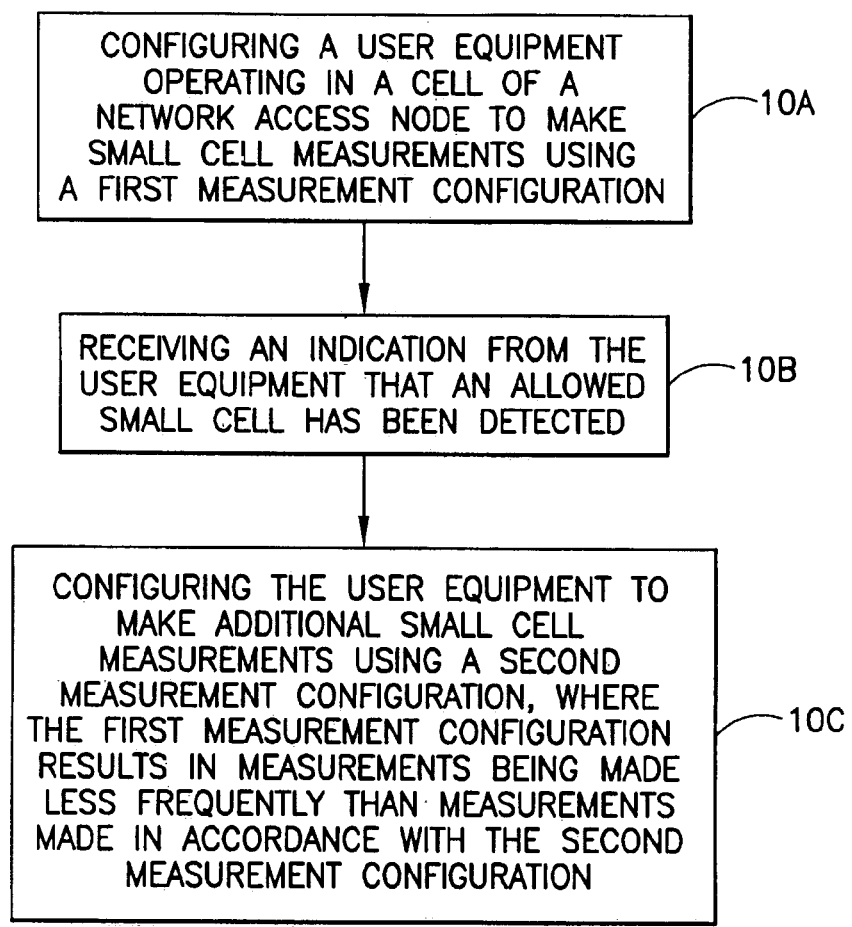

FIG. 10 is a logic flow diagram that illustrates the operation of a further method, and a result of execution of computer program instructions, in accordance with the exemplary embodiments of this invention. In accordance with these exemplary embodiments a method performs, at Block 10A, a step of configuring a user equipment operating in a cell of a network access node to make small cell measurements using a first measurement configuration. At Block 10B these is a step of receiving an indication from the user equipment that an allowed small cell has been detected. At Block 10C there is a step of configuring the user equipment to make additional small cell measurements using a second measurement configuration, where the first measurement configuration results in measurements being made less frequently than measurements made in accordance with the second measurement configuration.

In the method of FIG. 10, where the received indication is a second indication, and where configuring the user equipment to make small cell measurements using the first measurement configuration is performed in response to receiving at the network access node a first indication from the user equipment, the first indication indicating proximity of the user equipment to a small cell.

In the method of FIG. 10 and the preceding paragraph, where the first indication comprises an identification of a frequency carrier, and where the first measurement configuration is configured to cause the user equipment to make measurements of the frequency carrier.

In the method of FIG. 10, where configuring the user equipment to make small cell measurements using the first measurement configuration is performed autonomously by the network access node based at least on knowledge of a presence of one or more small cells in the cell of the network access node.

In the method of FIG. 10 and the preceding paragraphs descriptive of FIG. 10, where the small cell is one of a picocell or a home eNB cell configured with closed or hybrid access mode.

The exemplary embodiments of this invention also encompass a non-transitory computer-readable medium that contains software program instructions, where execution of the software program instructions by at least one data processor results in performance of operations that comprise execution of the method of FIG. 9 or the method of FIG. 10 and the preceding several paragraphs descriptive of FIG. 9 and FIG. 10.

As such, the various blocks shown in FIGS. 9 and 10 may be viewed as method steps, and/or as operations that result from operation of computer program code, and/or as a plurality of coupled logic circuit elements constructed to carry out the associated function(s). Thus, these exemplary embodiments also encompass apparatus, such as user equipment and network access nodes (e.g., eNBs) that are constructed and operated in accordance with the methods shown in FIGS. 9 and 10, respectively.

For example, the exemplary embodiments also encompass an apparatus that comprises a processor and a memory including computer program code. The memory and computer program code are configured, with the processor, to cause the apparatus at least to receive a first measurement configuration at a user equipment from a wireless communication network, to make measurements using the first measurement configuration, in response to a condition being satisfied resulting from the measurements that are made, to transmit an indication that an allowed small cell has been detected, to receive a second measurement configuration at the user equipment from the wireless communication network and to make measurements of the allowed small cell using the second measurement configuration. The first measurement configuration results in measurements being made less frequently than measurements made in accordance with the second measurement configuration.

Further by example the exemplary embodiments also encompass an apparatus that comprises a processor and a memory including computer program code. The memory and computer program code are configured, with the processor, to cause the apparatus at least to configure a user equipment that is operating in a cell of a network access node to make small cell measurements using a first measurement configuration; to receive an indication from the user equipment that an allowed small cell has been detected; and to configure the user equipment to make additional small cell measurements using a second measurement configuration. The first measurement configuration results in measurements being made less frequently than measurements made in accordance with the second measurement configuration.

The exemplary embodiments also include an apparatus that comprises means for receiving a first measurement configuration at a user equipment from a wireless communication network; means for making measurements using the first measurement configuration; means, responsive to a condition being satisfied resulting from the measurements that are made, for transmitting an indication that an allowed small cell has been detected; means for receiving a second measurement configuration at the user equipment from the wireless communication network; and means for making measurements of the allowed small cell using the second measurement configuration. The first measurement configuration results in measurements being made less frequently than measurements made in accordance with the second measurement configuration.

The various recited means can be embodied as the transceiver 10D, the data processor, memory and program 10A, 10B and 10C, and the small cell measurement and detection (SCMD) functionality 10E.

The exemplary embodiments also include an apparatus that comprises means for configuring a user equipment operating in a cell of a network access node to make small cell measurements using a first measurement configuration; means for receiving an indication from the user equipment that an allowed small cell has been detected; and means for configuring the user equipment to make additional small cell measurements using a second measurement configuration. The first measurement configuration results in measurements being made less frequently than measurements made in accordance with the second measurement configuration.

These various recited means can be embodied as the transceiver 12D, the data processor, memory and program 12A, 12B and 12C, and the compatible small cell (SC) functionality 12E.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the UTRAN-LTE and LTE-A systems, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters are not intended to be limiting in any respect, as these parameters may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

The invention claimed is:

1. A method, comprising:
receiving a first measurement configuration at a user equipment from a wireless communication network;
making measurements using the first measurement configuration;
in response to a condition being satisfied resulting from the measurements that are made using the first measurement configuration, transmitting an indication that an allowed small cell has been detected;
receiving a second measurement configuration at the user equipment from the wireless communication network; and
making measurements of the allowed small cell using the second measurement configuration to determine whether the allowed small cell can be utilized to provide service to the user equipment, where the first measurement configuration results in measurements being made less frequently than measurements made in accordance with the second measurement configuration; and where the condition that is satisfied comprises detection that the user equipment is in the proximity of a small cell that the user equipment is allowed to obtain service from.

2. The method of claim 1, comprising an initial step, performed in response to a precondition being satisfied of transmitting a message from the user equipment to the wireless communication network, the message indicating proximity to a small cell and where the precondition that is satisfied comprises a determination that there is a potential for an allowed small cell to be located in the vicinity of the user equipment.

3. The method of claim 1, where the first measurement configuration is received from the wireless communications network in response to a precondition being satisfied and without being requested by the user equipment and where the precondition that is satisfied comprises a determination that there is a potential for an allowed small cell to be located in the vicinity of the user equipment.

4. The method as in claim 1, where the small cell is one of a picocell or a home eNB cell, and where the condition that is satisfied comprises detecting an allowed picocell or home eNB cell configured with closed or hybrid access mode.

5. The method as in claim 1, where the small cell is a home eNB cell configured as closed subscriber group or hybrid access mode, and where the condition that is satisfied comprises detecting a closed subscriber group or hybrid cell having an identity found in a white list of the user equipment.

6. The method of claim 1, where the steps of transmitting and receiving are accomplished in a macrocell having an area in which the small cell is located.

7. The method of claim 2, where the precondition comprises detecting a presence of an RF fingerprint that matches a stored RF fingerprint.

8. The method of claim 2, where the precondition comprises the user equipment having performed an outbound procedure from a home small cell.

9. The method of claim 3, where the precondition comprises detection by the wireless communication network that the user equipment has entered a certain macrocell or small cell.

10. The method of claim 2, where the message comprises an identification of a frequency carrier, and where the first measurement configuration is configured to cause the user equipment to make measurements of the frequency carrier.

11. A non-transitory computer-readable medium that contains software program instructions, where execution of the software program instructions by at least one data processor results in performance of operations that comprise execution of the method of claim 1.

12. An apparatus, comprising:
a processor; and
a memory including computer program code, where the memory and computer program code are configured, with the processor, to cause the apparatus at least to receive a first measurement configuration at a user equipment from a wireless communication network, to make measurements using the first measurement configuration, in response to a condition being satisfied resulting from the measurements that are made using the first measurement configuration, to transmit an indication that an allowed small cell has been detected, to receive a second measurement configuration at the user equipment from the wireless communication network and to make measurements of the allowed small cell using the second measurement configuration to determine whether the allowed small cell can be used to provide service to the user equipment, where the first measurement configuration results in measurements being made less frequently than measurements made in accordance with the second measurement configuration; and where the condition that is satisfied comprises detection that the user equipment is in the proximity of a small cell that the user equipment is allowed to obtain service from.

13. The apparatus of claim 12, where the processor and memory are further configured to cause the user equipment, in response to a precondition being satisfied, to transmit a message to the wireless communication network, the message indicating proximity to a small cell, and to receive the first measurement configuration in response to transmitting the message, where the precondition that is satisfied comprises a determination that there is a potential for an allowed small cell to be located in the vicinity of the user equipment.

14. The apparatus of claim 12, where the processor and memory are further configured to cause the user equipment to receive the first measurement configuration from the wireless communications network in response to a precondition being satisfied and without being requested by the user equipment, where the precondition that is satisfied comprises a determination that there is a potential for an allowed small cell to be located in the vicinity of the user equipment.

15. The apparatus as in claim 12, where the small cell is one of a picocell or a home eNB cell where the home eNB can be configured with closed or hybrid access mode, and where the condition that is satisfied comprises detecting an allowed picocell or home eNB cell configured with closed or hybrid access mode having an identity found in a white list of the user equipment.

16. The apparatus of claim 13, where the precondition comprises detecting a presence of an RF fingerprint that matches a stored RF fingerprint.

17. The apparatus of claim 13, where the precondition comprises the user equipment having performed an outbound procedure from a home small cell.

18. The apparatus of claim 14, where the precondition comprises detection by the wireless communication network that the user equipment has entered a certain macrocell or small cell.

19. The apparatus of claim 13, where the message comprises an identification of a frequency carrier, and where the first measurement configuration is configured to cause the user equipment to make measurements of the frequency carrier.

20. A method, comprising:
configuring a user equipment operating in a cell of a network access node to make small cell measurements using a first measurement configuration;
receiving an indication from the user equipment that an allowed small cell has been detected as a result of the user equipment making measurements in accordance with the first measurement configuration; and
configuring the user equipment to make additional small cell measurements using a second measurement configuration to enable the user equipment to determine whether the allowed small cell can be utilized to provide service to the user equipment, where
the first measurement configuration results in measurements being made less frequently than measurements made in accordance with the second measurement configuration; and where
the indication is received in response to a condition being satisfied at the user equipment resulting from the measurements made in accordance with the first measurement configuration, where the condition that is satisfied comprises detection that the user equipment is in the proximity of a small cell that the user equipment is allowed to obtain service from.

21. The method of claim 20, where the received indication is a second indication, and where configuring the user equipment to make small cell measurements using the first measurement configuration is performed in response to receiving at the network access node a first indication from the user equipment, the first indication indicating proximity of the user equipment to a small cell.

22. The method of claim 20, where configuring the user equipment to make small cell measurements using the first measurement configuration is performed autonomously by the network access node based at least on knowledge of a presence of one or more small cells in the cell of the network access node.

23. The method of claim 20, where the small cell is one of a picocell or a home eNB cell configured with closed or hybrid access mode.

24. The method of claim 21, where the first indication comprises an identification of a frequency carrier, and where the first measurement configuration is configured to cause the user equipment to make measurements of the frequency carrier.

25. A non-transitory computer-readable medium that contains software program instructions, where execution of the software program instructions by at least one data processor results in performance of operations that comprise execution of the method of claim 20.

* * * * *